Oct. 15, 1957
A. J. FERNICOLA
2,810,058
STOVE BURNER
Filed Oct. 13, 1955
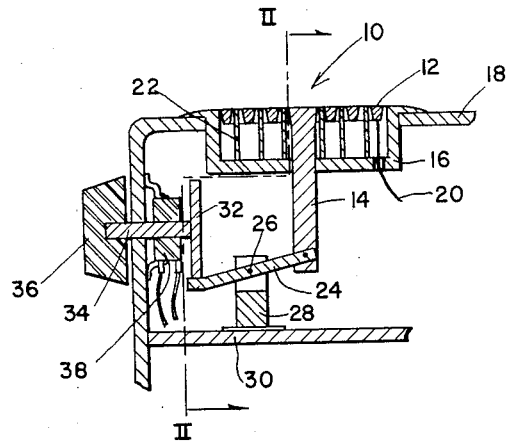
Fig 1
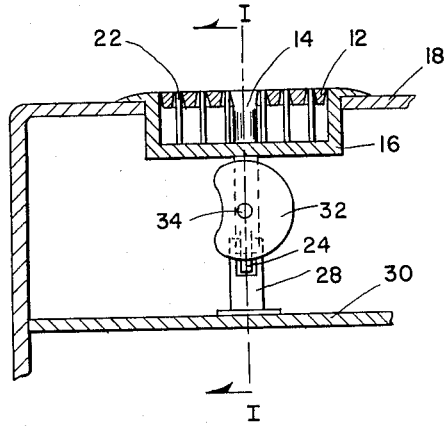
Fig 2
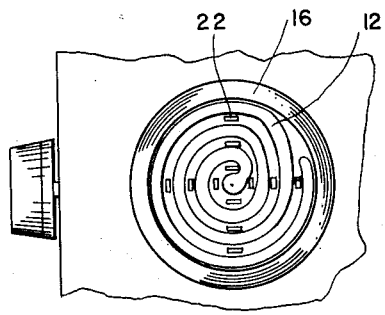
Fig 3
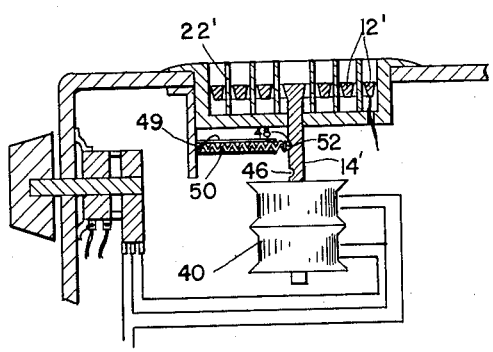
Fig 4
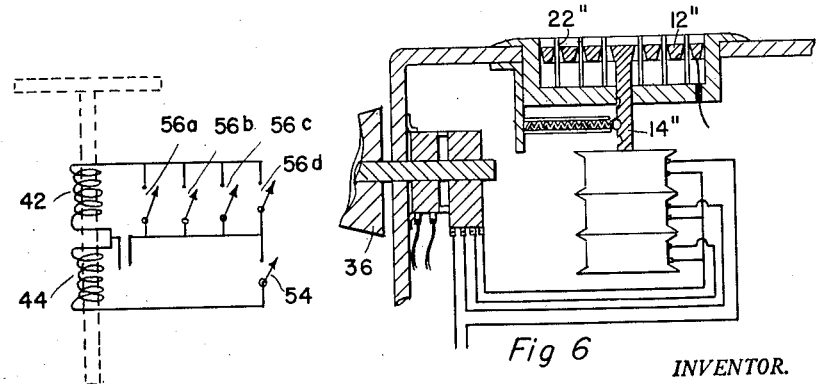
Fig 5
Fig 6
INVENTOR.
Anthony J. Fernicola
BY
Robert Wright United States Patent Office 2,810,058
Patented Oct. 15, 1957

2,810,058
STOVE BURNER
Anthony J. Fernicola, Utica, N. Y.
Application October 13, 1955, Serial No. 540,279
5 Claims. (Cl. 219—37)

This invention relates to an improved form of cooking range and more particularly to an improved electric cooking range of the type wherein the surface of the burner element is in intimate contact with the bottom of the cooking utensil placed thereon.

Heretofore it has been customary in electric cooking ranges to provide a burner element in the configuration of a helix wherein the turns of the helix are a relatively broad flat metallic heating element that provides an overall flat heating surface upon which the pan or other utensil rests for cooking of food contained therein. This configuration has provided a very efficient and fast source of cooking heat and for many applications is ideally suited. However, it has been found that with this particular construction, which is generally standard on the majority of stoves made today, foods that have to be boiled, frequently boil over. This is particularly true with foods of the so-called starchy type. This boiling over and out of the pot onto the stove and heating element causes a difficult mess for the housewife to have to clean up. This occurs even though the housewife may turn the burner off before actual boiling over and is particularly perturbing to the new convert from the gas type stove.

The housewife who has been used to using gas stoves merely turns off the gas when a pot begins to boil, but with electric stoves merely turning off the switch does not remove the heat since there is considerable heat built up in the heating element which takes a substantial length of time to dissipate. Consequently, housewives who use an electric stove must keep a constant vigil and anticipate when to turn off a boiling pot to keep from having to clean up a very messy stove.

According to the present invention I have discovered an apparatus for immediately reducing the heat of the burner element sufficiently to prevent such boiling over by merely turning the switch for a given burner to the off position.

It is an object of the present invention to provide a burner construction that provides for the immediate removal of heat from a pot placed thereon when the switch is turned to the off position. It is another object of the present invention to provide an electric burner construction whereby the housewife may prevent boiling over of foods therein without having to remove the pot from the burner. It is another object of the present invention to provide an electric burner construction such that maximum heating efficiency may be obtained with minimum risk of boiling over of foods placed in a container thereon. It is a further object of the present invention to provide a burner construction that when turned to the "off" position immediately removes the cooking heat from the cooking surface thereof so that the possibility of accidental burning is materially reduced. It is a still further object of the present invention to provide a vertically adjustable burner element that will accomplish the foregoing. It is a still further object of the present invention to provide an electric cooking assembly in which the burner element is of a simplified and economical construction that may be automatically adjusted toward and away from the bottom of a utensil placed thereon. It is a still further object of the present invention to provide an electric cooking element that may be automatically moved into and away from contact with the cooking utensil merely by turning the on-off switch for the burner concerned. These and other and further objects will be in part apparent and in part pointed out as the specification proceeds.

In the drawings:

Figure 1 is a fragmentary sectional view of a burner according to the present invention taken on line I—I of Figure 2;

Figure 2 is a sectional view taken on line II—II of Figure 1;

Figure 3 is a fragmentary top plan view of the burner element of Figure 1;

Figure 4 is a view similar to Figure 1 of another embodiment of the present invention;

Figure 5 is a schematic diagram of the solenoid control means for the embodiment of Figure 4; and Figure 6 is a view similar to Figure 4 of another embodiment of the present invention.

Referring now to Figure 1 there is shown a cooking assembly according to the present invention. The cooking assembly 10 comprises a conventional burner element 12 of the usual helical design, mounted on a supporting shaft 14 in a shallow recess or well 16 in the outer shell 18 of the usual electric stove. The burner element 12 is essentially a standard heating unit but mounted for vertical movement within the shallow well 16. The usual electrical connection may be made through cable 20 to provide for flexible movement thereof and detachment for cleaning in the conventional manner.

Fixed to the bottom of shallow well 16 and projecting through the spaces between the turns of the burner element 12 are a plurality of utensil supporting members 22 which are adapted to support the cooking utensil at the level of the burner surface regardless of the position of the heating element 12. Preferably these supporting elements are made of a non-heat conducting material although a metal material may be used if desired. As may be seen in Figure 3 a "cross" shaped pattern is shown provides a series of spaced points of support for a utensil placed on the burner assembly regardless of the position of the burner element 12. Obviously, other configurations could be used than the one shown. The supporting column 14 slidably extends through the bottom of well 16 and is connected at the bottom thereof to a link 24 which is pivotally mounted at 26 on block 28 mounted on a shelf 30 which in turn is fixed to outer shell 18 of the stove. The other end of lever 24 engages a cam member 32 which is mounted on shaft 34 of the on-off switch 36 for cooking assembly 10. Shaft 34 also controls the electrical functions of the burner element through the usual switch assembly 38 to which it is operatively connected.

As may be seen in Figure 2 cam 32 has a substantially circular configuration with a depression cut in one side thereof. Cam 32 is mounted on shaft 34 such that the depression corresponds with the "off" position of switch 36. Thus it will be seen that in all the "on" positions lever 24 will engage the outer periphery of the circular portion of cam 32 and will be forced into the position shown in Figure 1 to maintain the burner element 12 in surface alignment with the utensil supporting members 22. Indeed it may be desirable to have element 12 extend very slightly above members 22 to insure intimate contact with the bottom of a cooking utensil placed on the cooking assembly 10.

Thus in all the various "on" cooking positions of the switch 36 maximum efficiency of heating is assured since the burner element itself is in intimate contact with the bottom of the cooking utensil. In the "off" position the burner element 12 and the cooking heat is instantly and positively removed from contact with the bottom of the utensil which it has been found prevents the undesired boiling over mentioned above. Advantageously, I prefer to drop the burner element 12 a distance of approximately one-half inch although for certain applications the removal of the burning element only one-eighth of an inch is sufficient. Generally anywhere from one-eighth inch to one inch depending on the particular configuration of the cam and lever arrangement has been found satisfactory.

I have found that for the average size cooking utensil of one or two quarts moving the burner element 12 approximately one-eighth of an inch is ample to cut down the heat available so that boiling over is prevented. With very large burners and large pots it may be desirable to lower the burner element 12 a greater distance and accordingly I have found it desirable to use a distance of approximately one-half inch lowering. Obviously, while I have shown the burner as being the moving element the burner could be fixed and the utensil supporting elements 22 raised when the on-off switch 36 is turned to the "off" position thus effecting the same result.

Thus, whenever a utensil placed on a cooking element assembly 10 begins to boil over all the housewife need do is turn the on-off switch 36 to the "off" position and the heat is instantly removed sufficiently to prevent boiling over of the contents thereof. I have thus eliminated the necessity of removing the pot from the burner as is sometimes done with electric stoves of this type or in the alternative closely watching and judging when to turn the heat down in advance so that the time lag of the heat will not cause the contents to boil over. This problem is particularly acute with dishes such as rice, spaghetti, macaroni and the like and has been the cause of many a messy stove that has been very hard and difficult to clean.

An additional advantage perhaps not readily discernible is that with the present construction when a heating element is turned off it is lowered away from the burner assembly surface so that it is much more difficult to contact the heating element itself and thus the painful burns that are sometimes encountered when one thinks that an element is off, because the glow has left, are eliminated since the hand cannot be as readily placed in direct contact with heating element as with the conventional type electric cooking assembly.

For the sake of simplicity I have shown only one cooking unit 10, however it is clear that my invention could be applied to any number of the burners on a stove and I therefore do not intend to be limited to only one as shown.

Referring now to Figure 4 there is shown another embodiment of the present invention wherein the mechanical actuating mechanism has been replaced by an electrical solenoid assembly. In this configuration the supporting column 14′ for the burner element 12′ is extended to form the armature of a solenoid 40. Solenoid 40 has a pair of windings 42 and 44 (see Figure 5) for raising and lowering the burner element 12, respectively. Shaft 14′ has cut therein notches 46 and 48. A spring and ball assembly 49 comprising spring 50 which urges ball 52 into notches 46 and 48 serves to fix the burner in the raised or lowered position so that current need not be maintained on the solenoid 40 continuously.

As shown in Figure 5 the on-off switch contact assembly 38 has a series of contacts 56a–d which cause the solenoid 40 to raise the burner element 12′ to the cooking position, such as shown in Figure 1, regardless of the heat position selected. Thus, on all but the "off" position of switch 36 the burner element 12′ is in the raised position of Figure 1. In the "off" position of switch 36 contacts 54 are closed to energize winding 44 of solenoid 40 to withdraw the burner element 12′ to the lowered position shown in Figure 4.

The contacts 54 and 56a–d are of the so called brush or momentary contact type so that solenoid 40 is not continuously energized in its upper and lower positions. These are well known in the art and details are omitted for the sake of simplicity. Also, it is believed obvious that under some conditions it may be desirable to remove the solenoid from directly beneath the cooking well and connect it to the supporting column 14′ by a link mechanism so that spilled foods will not get into the solenoid coil and prevent proper operation thereof. Similarly it is believed obvious that while the supporting columns 14 and 14′ are fixed to the burner and solenoid and/or link mechanism, they may be readily made detachable so that they can be removed for easy cleaning as is customary in the more modern type of electric stove elements.

Referring now to Figure 6 there is shown a further embodiment of the present invention wherein a third or intermediate position is provided for the heating element 12″. By comparing with Figure 4 it can be seen that in the intermediate position of Figure 6 the burner element 12″ is removed to a point just slightly below the top surface of the utensil supporting elements 22″. This just removes the burner element 12″ from the contact with the bottom of the cooking utensil and permits use of glass cooking ware such as "Pyrex" and similar types of glass cooking ware that normally have to be placed on some sort of protective trivet before they can be heated with the conventional stove burner. This can be accomplished by a special setting of the on-off switch such that the normal "on" circuits are disabled and the Pyrex circuit is energized thus providing the desired spacing for all values of heat available on the on-off switch 36 and also providing for the complete removal of the cooking unit when in the "off" position.

While there is given above certain specific examples of this invention and their application in practical use, it should be understood that this is not intended to be exhaustive or to be limiting of the invention. On the contrary, these illustrations and explanations herein are given in order to acquaint others skilled in the art with this invention and the principles thereof and a suitable manner of its application in practical use, so that others skilled in the art may be enabled to modify the invention and to adapt and apply it in numerous forms each as may be best suited to the requirement of a particular use.

I claim:

1. In a cooking appliance structure a shell member, a plurality of shallow wells in said shell member; a plurality of burner members disposed in said wells; each of said burner members being mounted for vertical movement toward and away from the upper surface of said shell member; a utensil supporting member mounted across the mouth of said wells, the upper surface of said supporting member extending slightly above the upper surface of said shell member; said burner and utensil supporting members being adapted to nest together as said burner member is raised toward the upper surface of said shell, and means for raising and lowering said burner member so that the upper surface thereof is selectively made flush with the upper surface of said utensil supporting member.

2. In an electrically operated cooking appliance structure, a shell member, at least one burner element slidably disposed in said shell member for vertical movement toward and away from said shell member upper surface, said burner member having disposed about the surface thereof a plurality of open spaces, switch means for turning said burner element on and off, a multi-element utensil supporting member mounted on said shell member and extending through said open spaces, and control means for raising and lowering said burner element to and from said shell member upper surface, said means being operatively connected to said switch means for actuation thereby whereby when said switch means is in the "on" position said burner element is in the raised position and when said switch means is in the "off" position said burner element is in the lowered position.

3. A cooking stove structure as described in claim 2 wherein said control means comprises a cam member and lever assembly operatively connected between said switch means and said burner element.

4. A cooking stove structure as described in claim 2 wherein said control means comprises a solenoid operatively connected to said switch means and said burner element.

5. In an electrically operated cooking stove structure, an outer shell member, at least one shallow well disposed in the top surface of said shell member, a burner element of the flat helix type slidably mounted within said shallow well for vertical movement therein, switch means for turning said burner element on and off, a utensil supporting member having a plurality of spaced utensil bottom contacting elements, said elements being spaced so as to project through the spaces in the burner helix, said supporting member being fixed relative to said shell member, a cam member mounted on said switch means and operatively linked to said burner element whereby when said switch means is positioned in the "off" position said cam moves said burner element to a position in said shallow well below the upper surface of said outer shell member, and when in the "on" position said cam moves said burner element to a position in said well wherein the surface thereof is substantially flush with the top surface of said utensil supporting member.

References Cited in the file of this patent

UNITED STATES PATENTS

| | | |
|---|---|---|
| 2,257,580 | Trompeter | Sept. 30, 1941 |
| 2,733,332 | Mason | Jan. 31, 1956 |

FOREIGN PATENTS

| | | |
|---|---|---|
| 437,923 | Great Britain | Nov. 7, 1935 |
| 512,018 | Canada | Apr. 19, 1955 |